(12) United States Patent
Abusleme et al.

(10) Patent No.: US 10,920,006 B2
(45) Date of Patent: Feb. 16, 2021

(54) HYBRID POLYMERS

(71) Applicant: SOLVAY SPECIALTY POLYMERS ITALY S.P.A., Bollate (IT)

(72) Inventors: Julio A. Abusleme, Saronno (IT); Fiorenza D'Aprile, Nova Milanese (IT); Serena Carella, Parabiago (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 0 days.

(21) Appl. No.: 14/364,894

(22) PCT Filed: Dec. 6, 2012

(86) PCT No.: PCT/EP2012/074625
§ 371 (c)(1),
(2) Date: Jun. 12, 2014

(87) PCT Pub. No.: WO2013/087497
PCT Pub. Date: Jun. 20, 2013

(65) Prior Publication Data
US 2014/0378569 A1 Dec. 25, 2014

(30) Foreign Application Priority Data
Dec. 13, 2011 (EP) ..................... 11193190

(51) Int. Cl.
*C08G 18/62* (2006.01)
*C08G 18/76* (2006.01)
(Continued)

(52) U.S. Cl.
CPC ......... *C08G 18/6279* (2013.01); *C08G 18/10* (2013.01); *C08G 18/283* (2013.01);
(Continued)

(58) Field of Classification Search
CPC ............ C08G 18/6279; C08G 18/7621; C08G 18/4238; C08G 18/10; C08G 18/7843;
(Continued)

(56) References Cited

U.S. PATENT DOCUMENTS 6,107,393 A 8/2000 Abusleme et al.
2013/0202786 A1* 8/2013 Hara .................... C09D 167/00
427/162

FOREIGN PATENT DOCUMENTS

EP 391232 A1 10/1990
JP 05086321 A 4/1993
(Continued)

OTHER PUBLICATIONS

Van Krevelen D.W., "Some basic aspects of flame resistance of polymeric materials", Polymer, 1975, vol. 16, p. 615-620.

*Primary Examiner* — Rabon A Sergent
(74) *Attorney, Agent, or Firm* — Osha Bergman Watanabe & Burton LLP

(57) ABSTRACT

The present invention pertains to a polyurethane fluoropolymer [polymer ($F_p$)] obtainable by reacting: (i) at least one fluoropolymer [polymer (F)] comprising one or more recurring units derived from at least one (meth)acrylic monomer [monomer (MA)] having formula (I) here below: wherein: —$R_1$, $R_2$ and $R_3$, equal to or different from each other, are independently selected from a hydrogen atom and a $C_1$-$C_3$ hydrocarbon group, —$R_H$ is a $C_1$-$C_{10}$ hydrocarbon group comprising from 1 to 5 hydroxyl groups, x being an integer comprised between 1 and 5, and, optionally, comprising one or more functional groups selected from double bonds, epoxy, ester, ether and carboxylic acid groups, with (ii) at least one isocyanate compound comprising at least one isocyanate functional group [compound (I)], (iii) optionally in the presence of one or more chain extenders, said polyurethane fluoropolymer [polymer ($F_p$)] comprising at least one bridging group having formula (a) here below: wherein: —$R_H$ is a $C_1$-$C_5$ hydrocarbon group comprising from 1 to 5 urethane moieties, x being an integer comprised between 1 and 5, and, optionally, comprising one or more functional groups selected from double bonds, epoxy, ester, ether and carboxylic acid groups. The invention also pertains to a process for the manufacture of said polymer ($F_p$) and to uses of said polymer ($F_p$).

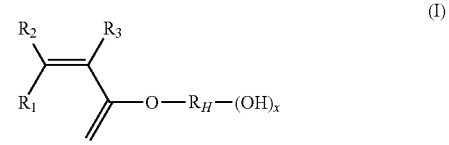

(I)

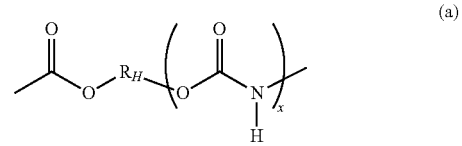

(a)

21 Claims, No Drawings

(51) Int. Cl.
  *C08G 18/42* (2006.01)
  *C08G 18/10* (2006.01)
  *C08G 18/78* (2006.01)
  *C08G 18/32* (2006.01)
  *C08G 18/28* (2006.01)
  *C08G 18/75* (2006.01)
  *C08G 18/48* (2006.01)
  *C08G 18/65* (2006.01)
  *C08J 5/22* (2006.01)
  *C08G 101/00* (2006.01)

(52) U.S. Cl.
  CPC ..... *C08G 18/3206* (2013.01); *C08G 18/3228* (2013.01); *C08G 18/4238* (2013.01); *C08G 18/4833* (2013.01); *C08G 18/6511* (2013.01); *C08G 18/6529* (2013.01); *C08G 18/758* (2013.01); *C08G 18/7621* (2013.01); *C08G 18/7806* (2013.01); *C08G 18/7843* (2013.01); *C08J 5/2262* (2013.01); *C08G 2101/00* (2013.01); *C08J 2375/04* (2013.01); *C08J 2375/08* (2013.01)

(58) Field of Classification Search
  CPC .............. C08G 2101/00; C08G 18/283; C08G 18/3206; C08G 18/3228; C08G 18/4833; C08G 18/6511; C08G 18/6529; C08G 18/758; C08G 18/7806; C08J 5/2262; C08J 2375/08; C08J 2375/04
  See application file for complete search history.

(56) References Cited

FOREIGN PATENT DOCUMENTS

| | | |
|---|---|---|
| JP | 07206973 A | 8/1995 |
| JP | 2003192749 A | 7/2003 |
| JP | 2004250560 A | 9/2004 |
| WO | 9926994 A1 | 6/1999 |
| WO | 2003016412 A1 | 2/2003 |
| WO | 2003070791 A1 | 8/2003 |
| WO | 2008129041 A1 | 10/2008 |

\* cited by examiner

HYBRID POLYMERS

This application is a U.S. national stage entry under 35 U.S.C. § 371 of International Application No. PCT/EP2012/074625 filed Dec. 6, 2012, which claims priority to European application No. 11193190.3 filed on Dec. 13, 2011. The entire contents of these applications are explicitly incorporated herein by this reference.

TECHNICAL FIELD

The present invention pertains to hybrid polymers, to a process for their manufacture and to their uses.

BACKGROUND ART

Fluorinated polymers possess a number of valuable properties, such as thermal and chemical stability and mechanical strength, which make them very perspective for a wide variety of applications including building industries, petrochemical and automotive industries, aerospace and aeronautics, chemical engineering, optics, treatment of textile, stone protection, microelectronics, cable insulation.

However, fluorinated polymers notably suffer from high water repellency.

On the other hand, hydrogenated polymers are advantageously endowed with high affinity with water but notably suffer from high flammability and low oil repellency.

There is thus a need in the art for hybrid polymers combining desirable and advantageous properties of both fluorinated and hydrogenated polymers, which are notably endowed with enhanced molecular weight to be suitable for use in a wide variety of applications.

SUMMARY OF INVENTION

It has been now found that a hybrid polymer comprising at least one fluorocarbon chain and at least one hydrocarbon chain linked to each other by one or more urethane moieties is advantageously endowed with enhanced molecular weight to be successfully used in a wide variety of applications.

It is thus an object of the present invention a polyurethane fluoropolymer [polymer $(F_p)$] obtainable by reacting:

(i) at least one fluoropolymer [polymer (F)] comprising one or more recurring units derived from at least one (meth)acrylic monomer [monomer (MA)] having formula (I) here below:

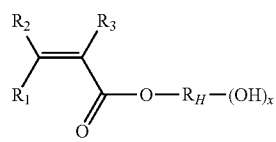

wherein:
R$_1$, R$_2$ and R$_3$, equal to or different from each other, are independently selected from a hydrogen atom and a C$_1$-C$_3$ hydrocarbon group,
R$_H$ is a C$_1$-C$_{10}$ hydrocarbon group comprising from 1 to 5 hydroxyl groups, x being an integer comprised between 1 and 5, and, optionally, comprising one or more functional groups selected from double bonds, epoxy, ester, ether and carboxylic acid groups, with
(ii) at least one isocyanate compound comprising at least one isocyanate functional group [compound (I)],
(iii) optionally in the presence of one or more chain extenders, said polyurethane fluoropolymer [polymer $(F_p)$] comprising at least one bridging group having formula (a) here below:

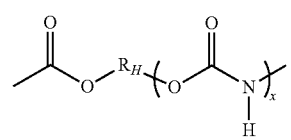

wherein:
R$_H$ is a C$_1$-C$_{10}$ hydrocarbon group comprising from 1 to 5 urethane moieties, x being an integer comprised between 1 and 5, and, optionally, comprising one or more functional groups selected from double bonds, epoxy, ester, ether and carboxylic acid groups.

By the term "fluoropolymer [polymer (F)]", it is hereby intended to denote a polymer comprising one or more recurring units derived from at least one fluorinated monomer (F).

The fluoropolymer [polymer (F)] is advantageously free from urethane moieties. For the purpose of the present invention, by "urethane moiety" is hereby intended to denote a moiety having formula:

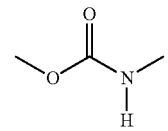

The polymer (F) is thus distinguishable from the polymer $(F_P)$, said polymer $(F_P)$ comprising, as essential feature, at least one bridging group of formula (a) as described above, said bridging group comprising one or more urethane moieties.

By the term "fluorinated monomer [monomer (F)]", it is hereby intended to denote an ethylenically unsaturated monomer comprising at least one fluorine atom.

Most preferred fluorinated monomers (F) are vinylidene fluoride (VDF), chlorotrifluoroethylene (CTFE), hexafluoropropylene (HFP), tetrafluoroethylene (TFE), trifluoroethylene (TrFE) and vinyl fluoride.

The polymer (F) may further comprise one or more recurring units derived from at least one hydrogenated monomer [monomer (H)].

By the term "hydrogenated monomer [monomer (H)]", it is hereby intended to denote an ethylenically unsaturated monomer free from fluorine atoms.

Non-limitative examples of suitable hydrogenated monomers (H) include, notably, ethylene, propylene, vinyl monomers such as vinyl acetate.

The fluoropolymer [polymer (F)] comprises typically from 0.01% to 10% by moles of recurring units derived from at least one (meth)acrylic monomer (MA) having formula (I) as described above.

The (meth)acrylic monomer (MA) of the polymer (F) preferably complies with formula (I-bis) here below:

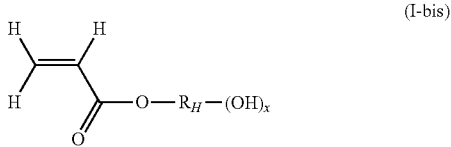

(I-bis)

wherein:
$R_H$ is a $C_1$-$C_{10}$ hydrocarbon group comprising from 1 to 5 hydroxyl groups, x being an integer comprised between 1 and 5, x being preferably equal to 1, and, optionally, comprising one or more functional groups selected from double bonds, epoxy, ester, ether and carboxylic acid groups.

Non-limitative examples of (meth)acrylic monomers (MA) include, notably, hydroxyethyl(meth)acrylate, hydroxypropyl(meth)acrylate, hydroxyethylhexyl(meth) acrylate.

The monomer (MA) is more preferably selected from the followings:

hydroxyethyl acrylate (HEA) of formula:

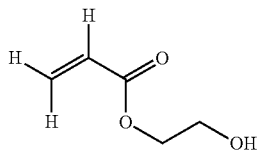

2-hydroxypropyl acrylate (HPA) of either of formulae:

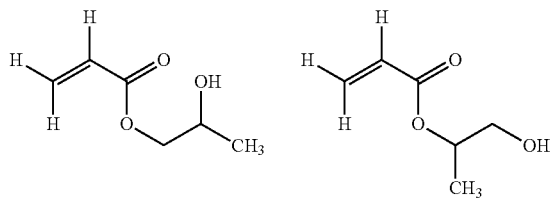

and mixtures thereof.

According to a first embodiment of the invention, the polymer (F) is a fluoropolymer [polymer ($F_1$)] comprising:
recurring units derived from vinylidene fluoride (VDF), and
recurring units derived from at least one (meth)acrylic monomer (MA) having formula (I) as described above.

The polymer ($F_1$) comprises typically at least 70% by moles, preferably at least 80% by moles, more preferably at least 90% by moles of recurring units derived from vinylidene fluoride (VDF).

The polymer ($F_1$) comprises typically at least 0.01% by moles, preferably at least 0.05% by moles, more preferably at least 0.1% by moles of recurring units derived from at least one (meth)acrylic monomer (MA) having formula (I) as described above.

The polymer ($F_1$) comprises typically at most 10% by moles, preferably at most 3% by moles, more preferably at most 1.5% by moles of recurring units derived from at least one (meth)acrylic monomer (MA) having formula (I) as described above.

The polymer ($F_1$) may further comprise recurring units derived from at least one other fluorinated monomer (F) as defined above.

Should one or more other fluorinated monomers (F) be present, the polymer ($F_1$) comprises typically from 0.1% to 10% by moles, preferably from 0.2% to 8% by moles, more preferably from 0.5% to 7.5% by moles of recurring units derived from said fluorinated monomers (F).

The polymer ($F_1$) preferably comprises:
from 0.3% to 1.5% by moles of recurring units derived from at least one (meth)acrylic monomer (MA) having formula (I) as described above, and
at least 80% by moles, preferably at least 95% by moles of recurring units derived from vinylidene fluoride (VDF).

The polymer ($F_1$) more preferably comprises:
from 0.3% to 1.5% by moles of recurring units derived from hydroxyethyl acrylate (HEA), and
at least 80% by moles, preferably at least 95% by moles of recurring units derived from vinylidene fluoride (VDF).

According to a variant of this first embodiment of the invention, the polymer ($F_1$) may further comprise from 0.5% to 7.5% by moles, preferably from 1.5% to 3.5% by moles of recurring units derived from hexafluoropropylene (HFP).

The polymer ($F_1$) of this first embodiment of the invention can be manufactured by aqueous suspension polymerization or by aqueous emulsion polymerization processes. The polymer ($F_1$) of this first embodiment of the invention is preferably manufactured by an aqueous suspension polymerization process as described in WO 2008/129041 (SOLVAY SOLEXIS S.P.A.) 30 Oct. 2008.

According to a second embodiment of the invention, the polymer (F) is a fluoropolymer [polymer ($F_2$)] comprising:
recurring units derived from ethylene (E),
recurring units derived from a fluorinated monomer (F) selected from tetrafluoroethylene (TFE), chlorotrifluoroethylene (CTFE) and mixtures thereof, and
recurring units derived from at least one (meth)acrylic monomer (MA) having formula (I) as described above.

The polymer ($F_2$) of this second embodiment of the invention comprises typically from 0.01% to 10% by moles by moles of recurring units derived from at least one (meth)acrylic monomer (MA) having formula (I) as described above.

The polymer ($F_2$) of this second embodiment of the invention preferably has a mole ratio between ethylene (E) and fluorinated monomer(s) (F) ranging from 10:90 to 70:30.

The polymer ($F_2$) of this second embodiment of the invention more preferably comprises:
from 30% to 65% by moles, preferably from 35% to 55% by moles of recurring units derived from ethylene (E),
from 65% to 35% by moles, preferably from 60% to 45% by moles of recurring units derived from chlorotrifluoroethylene (CTFE) and/or from tetrafluoroethylene (TFE), and
from 0.01% to 10% by moles, preferably from 0.5% to 8% by moles of recurring units derived from at least one (meth)acrylic monomer (MA) having formula (I) as described above.

The polymer ($F_2$) of this second embodiment of the invention is even more preferably an ECTFE polymer, that is to say that the fluorinated monomer (F) is chlorotrifluoroethylene (CTFE).

The polymer ($F_2$) of this second embodiment of the invention can be manufactured by aqueous suspension polymerization or by aqueous emulsion polymerization processes. The polymer ($F_2$) of this second embodiment of the invention is preferably manufactured as described in U.S. Pat. No. 6,107,393 (AUSIMONT S.P.A.) 22 Aug. 2000.

The isocyanate compound [compound (I)] is typically an aliphatic or aromatic compound comprising at least one isocyanate functional group.

The isocyanate compound [compound (I)] is preferably a polyisocyanate compound [compound $(I_P)$].

By the term "polyisocyanate", it is hereby intended to denote a compound comprising at least two isocyanate functional groups.

The polyisocyanate compound [compound $(I_P)$] is typically selected from the group consisting of aliphatic and aromatic polyisocyanates comprising at least two isocyanate functional groups.

Very good results have been achieved with polyurethane fluoropolymers [polymers $(F_P)$] obtainable by reacting:
(i) at least one fluoropolymer [polymer (F)] as defined above with
(ii) at least one polyisocyanate compound [compound $(I_P)$] selected from aliphatic and aromatic polyisocyanates comprising at least two isocyanate functional groups,
(iii) optionally in the presence of one or more chain extenders.

The polyisocyanate compound [compound $(I_P)$] is preferably a di-isocyanate having formula (II) here below:

$$O=C=N-E-N=C=O \qquad (II)$$

wherein E is a divalent poly(hydrocarbon) group, linear or branched, optionally comprising one or more aromatic or cycloaliphatic groups and/or one or more functional groups.

The divalent (poly)hydrocarbon group E of the di-isocyanate having formula (II) as described above may be selected from the followings:

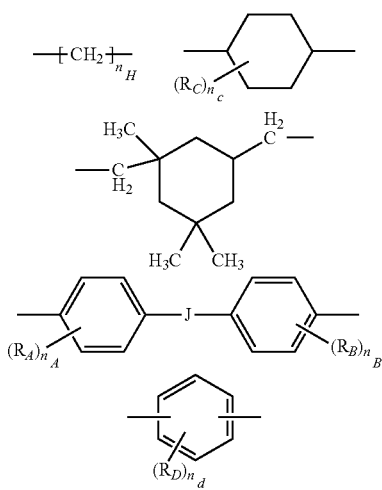

and mixtures thereof;
wherein:
$n_H$ is an integer from 1 to 12, preferably equal to 6;
J is a divalent bridging group selected from the followings: a single bond; a methylene group (—CH$_2$—); an oxygen atom (—O—); a —C(CH$_3$)$_2$— group; a —C(CF$_3$)$_2$— group; a —SO$_2$— group; a —C(O)— group; a hydrocarbon group which may comprise one or more functional groups; a polyhydrocarbon group which may comprise one or more functional groups;

each of $R_A$, $R_B$, $R_C$, $R_D$, equal or different at each occurrence, is independently a halogen atom (e.g. Cl, Br, F), a $C_1$-$C_6$ hydrocarbon group (e.g. methyl, ethyl), a substituent group like notably —OR$_H$, —NR$_H$R$_{H'''}$, —C(O)—R$_{H'''}$, wherein R$_H$, R$_{H'}$, R$_{H''}$, R$_{H'''}$, equal to or different from each other, are independently at each occurrence a hydrogen atom or a $C_1$-$C_6$ hydrocarbon group;
$n_A$, $n_B$, $n_d$ are independently integers from 0 to 4;
$n_C$ is an integer from 0 to 10.

Non-limiting examples of suitable di-isocyanates having formula (II) as described above include, notably, poly(ethylene adipate)-tolylene 2,4-diisocyanate, poly(propylene glycol)-tolylene 2,4-diisocyanate, hexamethylendiisocyanate, trimethylhexamethylenediisocyanate, isophoron diisocyanate, 4,4'-methylenebis(cyclohexylisocyanate), cyclohexyl-1,4-diisocyanate, 4,4'-methylenebis(phenylisocyanate) or its isomers, toluene 2,4-diisocyanate or isomers thereof, xylylene diisocyanate, naphthalene-1,5-diisocyanate, p-phenylen-diisocyanate.

The chain extender is typically selected from aliphatic and aromatic polyols and polyamines.

Non-limitative examples of suitable polyols include, notably, the followings:
aliphatic diols of formula HO—R$_{diol}$—OH, wherein R$_{diol}$ is a $C_2$-$C_6$ hydrocarbon group which may comprise one or more ether oxygen atoms, such as 1,2-ethanediol, 1,4-butanediol, 1,6-hexanediol, diethylene glycol, dipropylene glycol; and
polyethylene glycols of formula HO—(CH$_2$CHRO)$_n$—R', wherein R is H or a $C_1$-$C_5$ alkyl group, R' is H or CH$_3$ and n is an integer comprised between 4 and 230000, having an average molecular weight typically comprised between 200 and 10000000, preferably between 1000 and 5000000.

Non-limitative examples of suitable polyamines include, notably, the followings:
aliphatic diamines of formula H$_2$N—R$_{diamine}$—NH$_2$, wherein R$_{diamine}$ is a $C_2$
$C_{14}$ hydrocarbon group, such as ethylene diamine, 1,2-propylenediamine, 1,3-propylenediamine, N-methylpropylene-1,3-diamine, 1,4-butylenediamine, N,N'-dimethylethylenediamine; and
(cyclo)aliphatic diamines such as isophoronediamine.

The polyurethane fluoropolymer [polymer $(F_P)$] of the invention advantageously comprises:
at least one fluorinated block comprising a fluorocarbon chain [chain $(R_{FC})$], and
at least one hydrogenated block comprising a hydrocarbon chain [chain $(R_{HC})$],
said blocks being linked to each other by one or more urethane moieties.

The expressions "at least one fluorinated block comprising a fluorocarbon chain [chain $(R_{FC})$]" and "at least one hydrogenated block comprising a hydrocarbon chain [chain $(R_{HC})$]" are understood to mean that the polymer $(F_P)$ may comprise one or more than one fluorinated block and one or more than one hydrogenated block. The polymer $(F_P)$ generally comprises several fluorinated blocks and several hydrogenated blocks. Optionally, in addition, the polymer $(F_P)$ may comprise additional recurring units derived from well-known polyurethane modifiers, e.g. from chain extenders, and the like.

The fluorocarbon chain [chain $(R_{FC})$] of the polymer $(F_P)$ advantageously comprises recurring units derived from at least one fluorinated monomer (F) as defined above, at least one (meth)acrylic monomer (MA) having formula (I) as defined above and, optionally, at least one hydrogenated monomer (H) as defined above, said recurring units being randomly distributed along the fluorocarbon chain.

The fluorocarbon chain [chain ($R_{FC}$)] of the polymer ($F_P$) preferably consists of recurring units derived from at least one fluorinated monomer (F) as defined above, at least one (meth)acrylic monomer (MA) having formula (I) as defined above and, optionally, at least one hydrogenated monomer (H) as defined above, said recurring units being randomly distributed along the fluorocarbon chain.

The hydrocarbon chain [chain ($R_{HC}$)] of the polymer ($F_P$) advantageously comprises recurring units derived from one or more hydrogenated monomers [monomers (H')], said recurring units being randomly distributed along the hydrocarbon chain.

By the term "hydrogenated monomer [monomer (H')]", it is hereby intended to denote a linear or branched, saturated or unsaturated monomer free from fluorine atoms.

The recurring units of the hydrocarbon chain [chain ($R_{HC}$)] of the polymer ($F_P$) are optionally linked to each other by one or more functional groups selected from ester, ether, urethane and amide groups.

The hydrocarbon chain [chain ($R_{HC}$)] of the polymer ($F_P$) is preferably free from fluorine atoms.

The hydrocarbon chain [chain ($R_{HC}$)] of the polymer ($F_P$) more preferably consists of recurring units derived from one or more hydrogenated monomers (H'), said recurring units being randomly distributed along the hydrocarbon chain.

The hydrocarbon chain [chain ($R_{HC}$)] typically has from 2 to 10000 carbon atoms, preferably from 2 to 1000 carbon atoms, more preferably from 2 to 500 carbon atoms.

The hydrocarbon chain [chain ($R_{HC}$)] optionally comprises one or more aromatic or cycloaliphatic groups.

The fluorocarbon chain [chain ($R_{FC}$)] of the polymer ($F_P$) advantageously comprises chain-end groups having formula (b) here below:

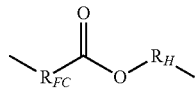

(b)

wherein $R_H$ is a $C_1$-$C_{10}$ hydrocarbon group optionally comprising one or more functional groups selected from double bonds, epoxy, ester, ether and carboxylic acid groups.

The chain-end groups of formula (b) of the fluorocarbon chain [chain ($R_{FC}$)] are bound to the hydrocarbon chain [chain ($R_{HC}$)] through one or more urethane moieties.

The polyurethane fluoropolymer [polymer ($F_P$)] preferably comprises:
from 0.01% to 99.99% by weight, preferably from 0.05% to 99.95% by weight, based on the weight of said polymer ($F_P$), of at least one fluorinated block comprising a fluorocarbon chain [chain ($R_{FC}$)], and
from 99.99% to 0.01% by weight, preferably from 99.95% to 0.05% by weight, based on the weight of said polymer ($F_P$), of at least one hydrogenated block comprising a hydrocarbon chain [chain ($R_{HC}$)], said blocks being linked to each other by one or more urethane moieties.

The Applicant thinks, without this limiting the scope of the invention, that by reaction of the polymer (F) with the isocyanate compound (I) the polymer (F) backbone is covalently coupled with one or more isocyanate functionalities through its pendant hydroxyl groups to provide for a polyurethane fluoropolymer [polymer ($F_P$)] advantageously having bridging groups of formula (a), said bridging groups comprising one or more urethane moieties.

As a result of the total number of bridging groups (a) in the polymer ($F_P$) backbone, the molecular weight of the polyurethane fluoropolymer [polymer ($F_P$)] is successfully enhanced over a fluoropolymer free from urethane moieties.

The polyurethane fluoropolymer ($F_P$) of the present invention is thus successfully endowed with enhanced molecular weight to be advantageously used in a wide variety of applications.

As the molecular weight of the polyurethane fluoropolymer [polymer ($F_P$)] is enhanced, the solubility properties of the polymer ($F_P$) in a particular solvent are consequently advantageously reduced.

According to a first preferred embodiment of the invention, the polyurethane fluoropolymer [polymer ($F_P$)] is obtainable by reacting:
(i) at least 50% by weight, based on the total weight of the polymer (F) and the compound (I), of at least one fluoropolymer [polymer (F)] comprising one or more recurring units derived from at least one (meth)acrylic monomer [monomer (MA)] having formula (I) here below:

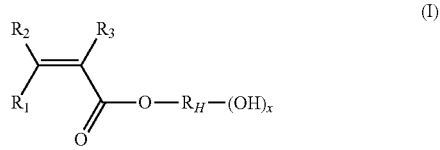

(I)

wherein:
$R_1$, $R_2$ and $R_3$, equal to or different from each other, are independently selected from a hydrogen atom and a $C_1$-$C_3$ hydrocarbon group,
$R_H$ is a $C_1$-$C_{10}$ hydrocarbon group comprising from 1 to 5 hydroxyl groups, x being an integer comprised between 1 and 5, and, optionally, comprising one or more functional groups selected from double bonds, epoxy, ester, ether and carboxylic acid groups,
with
(ii) less than 50% by weight, based on the total weight of the polymer (F) and the compound (I), of at least one isocyanate compound comprising at least one isocyanate functional group [compound (I)],
(iii) optionally in the presence of one or more chain extenders.

The fluoropolymer [polymer (F)] is defined as above.

The polyurethane fluoropolymer [polymer ($F_P$)] of this first preferred embodiment of the invention preferably comprises:
at least 80% by weight, preferably at least 95% by weight, based on the weight of said polymer ($F_P$), of at least one fluorinated block comprising a fluorocarbon chain [chain ($R_{FC}$)], and
at most 20% by weight, preferably at most 5% by weight, based on the weight of said polymer ($F_P$), of at least one hydrogenated block comprising a hydrocarbon chain [chain ($R_{HC}$)],
said blocks being linked to each other by one or more urethane moieties.

Most preferred polyurethane fluoropolymers [polymers ($F_P$)] according to this first preferred embodiment of the invention are obtainable by reacting at least one fluoropolymer [polymer (F)] with at least 0.1% by weight, preferably at least 0.5% by weight, based on the weight of said polymer (F), of at least one isocyanate compound [compound (I)], optionally in the presence of one or more chain extenders.

Most preferred polyurethane fluoropolymers [polymers $(F_p)$] according to this first preferred embodiment of the invention are obtainable by reacting at least one fluoropolymer [polymer (F)] with at most 20% by weight, preferably at most 10% by weight, based on the weight of said polymer (F), of at least one isocyanate compound [compound (I)], optionally in the presence of one or more chain extenders.

According to a variant of this first preferred embodiment of the invention, the polyurethane fluoropolymer [polymer $(F_P)$] is obtainable by reacting:

(i) at least 50% by weight, based on the total weight of the polymer (F), the compound (I) and the chain extender, of at least one fluoropolymer [polymer (F)] comprising one or more recurring units derived from at least one (meth)acrylic monomer [monomer (MA)] having formula (I) here below:

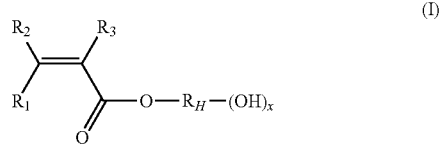

(I)

wherein:
$R_1$, $R_2$ and $R_3$, equal to or different from each other, are independently selected from a hydrogen atom and a $C_1$-$C_3$ hydrocarbon group,
$R_H$ is a $C_1$-$C_{10}$ hydrocarbon group comprising from 1 to 5 hydroxyl groups, x being an integer comprised between 1 and 5, and, optionally, comprising one or more functional groups selected from double bonds, epoxy, ester, ether and carboxylic acid groups,
with
(ii) less than 50% by weight, based on the total weight of the polymer (F), the compound (I) and the chain extender, of at least one isocyanate compound comprising at least one isocyanate functional group [compound (I)], and
(iii) from 0.01% to 50% by weight, based on the total weight of the polymer (F), the compound (I) and the chain extender, of one or more chain extenders selected from aliphatic and aromatic polyols and polyamines.

According to this variant of this first preferred embodiment of the invention, the chain extender is preferably selected from aliphatic diols and polyethylene glycols as defined above.

The polyurethane fluoropolymer [polymer $(F_P)$] of this variant of this first preferred embodiment of the invention preferably comprises:
at least 80% by weight, preferably at least 90% by weight, based on the weight of said polymer $(F_P)$, of at least one fluorinated block comprising a fluorocarbon chain [chain $(R_{FC})$], and
at most 20% by weight, preferably at most 10% by weight, based on the weight of said polymer $(F_P)$, of at least one hydrogenated block comprising a hydrocarbon chain [chain $(R_{HC})$],
said blocks being linked to each other by one or more urethane moieties.

The polyurethane fluoropolymer [polymer $(F_p)$] of this first preferred embodiment of the invention has advantageously a contact angle towards water of less than 85.0 degrees, preferably of less than 84.0 degrees, as measured at 25° C. according to ASTM D5725-99.

The Applicant has thus surprisingly found that the polyurethane fluoropolymer $(F_P)$ obtainable according to this first preferred embodiment of the invention is advantageously endowed, in addition to enhanced molecular weight, with outstanding hydrophilic properties.

According to a second preferred embodiment of the invention, the polyurethane fluoropolymer [polymer $(F_P)$] is obtainable by reacting:

(i) less than 50% by weight, based on the total weight of the polymer (F) and the compound $(I_P)$, of at least one fluoropolymer [polymer (F)] comprising one or more recurring units derived from at least one (meth)acrylic monomer [monomer (MA)] having formula (I) here below:

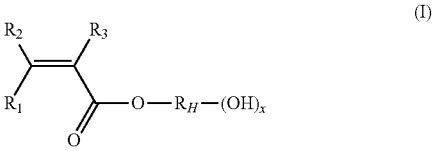

(I)

wherein:
$R_1$, $R_2$ and $R_3$, equal to or different from each other, are independently selected from a hydrogen atom and a $C_1$-$C_3$ hydrocarbon group,
$R_H$ is a $C_1$-$C_{10}$ hydrocarbon group comprising from 1 to 5 hydroxyl groups, x being an integer comprised between 1 and 5, and, optionally, comprising one or more functional groups selected from double bonds, epoxy, ester, ether and carboxylic acid groups,
with
(ii) at least 50% by weight, based on the total weight of the polymer (F) and the compound $(I_P)$, of at least one polyisocyanate compound [compound $(I_P)$],
(iii) in the presence of one or more chain extenders.

The fluoropolymer [polymer (F)] is defined as above.

The polyurethane fluoropolymer [polymer $(F_P)$] of this second preferred embodiment of the invention preferably comprises:
at most 50% by weight, preferably at most 40% by weight, based on the weight of said polymer $(F_P)$, of at least one fluorinated block comprising a fluorocarbon chain [chain $(R_{FC})$], and
at least 50% by weight, preferably at least 60% by weight, based on the weight of said polymer $(F_P)$, of at least one hydrogenated block comprising a hydrocarbon chain [chain $(R_{HC})$],
said blocks being linked to each other by one or more urethane moieties.

The polyurethane fluoropolymer [polymer $(F_p)$] of this second preferred embodiment of the invention has advantageously a contact angle towards hexadecane of higher than 0 degrees, preferably higher than 20.0 degrees, as measured at 25° C. according to ASTM D5725-99.

The Applicant has thus surprisingly found that the polyurethane fluoropolymer $(F_P)$ obtainable according to this second preferred embodiment of the invention is advantageously endowed, in addition to enhanced molecular weight, with outstanding oleophobic properties.

Further, the polyurethane fluoropolymer [polymer $(F_p)$] of this second preferred embodiment of the invention has advantageously a char yield higher than 0% at 550° C., as measured by thermogravimetric analysis (TGA) under nitrogen at a heating rate of 10° C. $min^{-1}$.

It is known in the art, as notably described in VAN KREVELEN, D. W.

Some basic aspects of flame resistance of polymeric materials. *Polymer* 1975, vol. 16, p. 615-620, that, as the amount of char residue that may be formed in thermal decomposition increases, the flame resistance of a polymeric material is improved.

It has been thus found that the polyurethane fluoropolymer [polymer ($F_p$)] of this second preferred embodiment of the invention is further advantageously endowed with outstanding flame retardancy.

Another object of the present invention is a process for the manufacture of a polyurethane fluoropolymer [polymer ($F_p$)] as defined above, said process comprising blending at least one polymer (F), at least one isocyanate compound (I) and, optionally, one or more chain extenders, optionally in the presence of a liquid medium, under temperatures comprised between 20° C. and 300° C., preferably between 20° C. and 250° C.

By the term "liquid medium", it is hereby intended to denote a medium which is available in liquid state at a temperature of 25° C.

The liquid medium typically comprises one or more organic solvents.

Non-limitative examples of liquid media suitable for the process of this second embodiment of the invention include, notably, N-methyl-2-pyrrolidone, ketones such as acetone, methylethylketone, methylisobutylketone, acetates such as ethyl acetate, butylacetate.

According to a first embodiment of the process of the invention, at least one polymer (F), at least one isocyanate compound (I) and, optionally, one or more chain extenders are blended, under temperatures comprised between 100° C. and 300° C., preferably between 100° C. and 250° C., to yield a solid composition.

The solid composition is typically mixed. The solid composition is then processed using conventional melt processing techniques, including extrusion through a die at temperatures generally comprised between 100° C. and 300° C., preferably between 100° C. and 250° C., to yield strands which are usually cut for providing pellets.

Twin screw extruders are preferred devices for accomplishing melt compounding of the solid composition.

Films can then be manufactured by processing the pellets so obtained through traditional film extrusion techniques.

The process of this first embodiment of the invention is particularly suitable for the manufacture of polyurethane fluoropolymers [polymer ($F_p$)] according to the first preferred embodiment of the invention.

According to a second embodiment of the process of the invention, at least one polymer (F), at least one isocyanate compound (I) and, optionally, one or more chain extenders are dispersed in a liquid medium, under temperatures comprised between 20° C. and 100° C., preferably between 20° C. and 50° C., to yield a liquid composition.

The liquid composition is then usually poured into a tray and heated to temperatures of typically at least 40° C., preferably at least 100° C., more preferably at least 150° C.

The process of this second embodiment of the invention is particularly suitable for the manufacture of polyurethane fluoropolymers [polymer ($F_p$)] according to the second preferred embodiment of the invention.

Also, another object of the present invention is use of the polyurethane fluoropolymer [polymer ($F_p$)] for manufacturing a membrane.

The present invention thus also pertains to a process for the manufacture of a membrane comprising at least one polyurethane fluoropolymer [polymer ($F_p$)] as defined above, and to the membrane so obtained, said membrane comprising at least one polyurethane fluoropolymer [polymer ($F_p$)] as defined above.

The polyurethane fluoropolymer [polymer ($F_p$)] obtainable according to the first preferred embodiment of the invention has been found to be particularly suitable for the manufacture of a membrane.

For the purpose of the present invention, the term "membrane" is intended to denote a discrete, generally thin, interface which moderates permeation of chemical species in contact with it. This interface may be homogeneous, that is, completely uniform in structure (dense membrane), or it may be chemically or physically heterogeneous, for example containing voids, pores or holes of finite dimensions (porous membrane). The terms "pore", "void" and "hole" will be used as synonyms within the context of the present invention.

The membrane of the invention is preferably a porous membrane.

Porous membranes are generally characterized by a porosity (ε) and an average pore diameter (d), said porosity being a measure of the fraction of the volume of the membrane which is porous.

The porous membrane of the invention has a porosity (ε) of advantageously at least 1%, preferably at least 2%, more preferably at least 3% and of advantageously at most 90%, preferably at most 80%.

These pores have generally an average diameter (d) of advantageously at least 0.01 μm, preferably at least 0.05 μm, more preferably at least 0.1 μm and of advantageously at most 50 μm, preferably at most 25 μm, more preferably at most 10 μm.

Should the membrane be a porous membrane, the process of the invention advantageously comprises at least one of irradiation, film expansion, template leaching, solution precipitation techniques, electrospinning technique.

According to the irradiation technique, a film of the polymer ($F_p$) is first irradiated with charged particles from a suitable radiation source, said particles typically breaking polymer chains and leaving sensitized/damaged tracks; then, said irradiated film is passed through a suitable etch solution etching preferentially along the sensitized tracks, thereby forming pores.

According to the film expansion technique, porous membranes are prepared by subsequent orientation and stretching of a film of the polymer ($F_p$); thus, an oriented film of the polymer ($F_p$) is typically extruded under drawdown; after cooling, the film is advantageously stretched at right angle to the original orientation, so that the crystalline structure of the polymer is typically deformed and slit-like voids are advantageously formed.

According to the template leaching technique, a film is prepared from a mixture of the polymer ($F_p$) and a leachable component. After the film has been formed, the leachable component is removed with a suitable solvent and a porous membrane is obtained. The leachable component could be a soluble low molecular weight solid or liquid, such as a plasticizer, a low molecular weight VDF polymer, and the like.

As the plasticizer, hydrogenated plasticizer may generally be used. Esters or polyesters such as citrates, phthalates, trimellitates, sabacates, adipates, azelates can be notably mentioned. Examples thereof may include: adipic acid-based polyesters of, e.g., the adipic acid-propylene glycol type, and the adipic acid-1,3-butylene glycol type; sebacic acid-based polyesters of, e.g., the sebacic acid-propylene glycol type; azelaic acid-based polyesters of e.g., the azelaic acid-propylene glycol type, and azelaic acid-1,3-butylene glycol type; alkyl phthalates like, e.g. di(2-ethyl hexyl) phthalate, diisononyl phthalate, diisodecyl phthalate; alkyl and acyl citrates, e.g. triethyl citrate, acetyl triethyl citrate, tri-n-butyl citrate, acetyl-tri-n-butyl citrate, trioctyl citrate, acetyl-tri-octyl citrate trihexyl citrate, acetyl-trihexyl citrate, butyryl-trihexyl citrate or trihexyl-o-butyryl citrate; alkyl trimelliltates, like notably trimethyl trimellitate, tri-(2-ethylhexyl)trimellitate, tri-(n-octyl,n-decyl) trimellitate tri-(heptyl,nonyl) trimellitate, n-octyl trimellitate.

The film of polymer ($F_P$) is typically dipped into an extraction solvent to extract the plasticizer. It is possible to carry out the extraction at room temperature obtaining a complete plasticizer extraction in a time ranging from some minutes to some hours, depending on the thickness, the nature of the extraction solvent and the agitation. Generally times of few minutes are sufficient to completely extract the plasticizer. After extraction, a porous membrane is obtained.

As extraction solvents, solvents wherein the plasticizer is soluble, but which are not compatible with the polymer (F), so as not to cause the swelling thereof, are generally used. The most commonly used class of solvents is that of aliphatic alcohols, preferably having a short chain, for example from 1 to 6 carbon atoms, more preferably methanol and isopropanol.

According to the solution precipitation technique, a solution comprising the polymer ($F_P$) is precipitated into two phases, namely a solid, polymer-rich phase which forms the matrix of the membrane and a liquid, polymer-poor phase that forms the membrane pores. Polymer precipitation from solution can be achieved in several ways, such as cooling, solvent evaporation, precipitation by immersion in a non-solvent, imbibition of a non-solvent from the vapour phase.

According to the electrospinning technique, a high voltage is used to create an electrically charged jet of polymer solution or melt comprising the polymer ($F_P$), which dries or solidifies to leave a polymer fiber.

Should the membrane be a dense membrane, the process of the invention advantageously comprises casting and/or melt forming a film of the polymer ($F_P$).

Casting generally involves solution casting, wherein typically a casting knife or draw-down bar is used to spread an even film of an appropriate solution of the polymer ($F_P$) in a liquid medium across a suitable support. After the casting has been made, the liquid generally evaporates to leave a uniform dense membrane.

Melt forming is commonly used to make dense membranes either by extrusion as a sheet from a die or as a blown film.

The membrane of the invention can be under the form of a flat-sheet membrane or can be produced under the form of thin tubes or fibers to yield hollow-fiber membranes. Flat-sheet membranes are generally preferred when high fluxes are required. Hollow-fiber membranes are particularly preferred when compact modules with high surface areas are required.

Non-limitative examples of membranes which can be obtained using the polyurethane fluoropolymer [polymer ($F_P$)] of the invention include, notably, filtration membranes which can be used in the chemical processing industry in various separation processes, such as microfiltration and ultrafiltration membranes, in particular porous hollow-fiber membranes for use in water filtration.

The membranes which can be obtained using the polyurethane fluoropolymer [polymer ($F_P$)] of the invention can also be used in biomedical applications, e.g. for haemodialysis, for controlled release of drugs, for artificial organs, such as kidney, lung and pancreas.

Still, another object of the present invention is use of the polyurethane fluoropolymer [polymer ($F_P$)] for manufacturing a polyurethane foam material.

The present invention thus also pertains to a process for the manufacture of a polyurethane foam material comprising at least one polyurethane fluoropolymer [polymer ($F_P$)] as defined above.

The polyurethane fluoropolymer [polymer ($F_P$)] obtainable according to the second preferred embodiment of the invention has been found to be particularly suitable for the manufacture of a polyurethane foam material.

The polyurethane foam material may be a flexible polyurethane foam or a rigid polyurethane foam.

The polyurethane foam materials can be advantageously used for a wide variety of applications including furniture, automotive seating, bedding and packaging, construction and building, paints and coatings, footwear and biomedical applications.

The polyurethane foam materials so obtained are particularly useful as construction insulation panels and as structural elements in construction applications, especially due to good flame retardancy properties of polyurethane fluoropolymers [polymers ($F_P$)] obtainable according to the second preferred embodiment of the invention.

Should the disclosure of any patents, patent applications, and publications which are incorporated herein by reference conflict with the description of the present application to the extent that it may render a term unclear, the present description shall take precedence.

The invention will be now described in more detail with reference to the following examples whose purpose is merely illustrative and not limitative of the scope of the invention.

Raw Materials

Polymer (F1): VDF-HEA (HEA: 1% by moles)

Polymer (F2): VDF-HFP-HEA (HFP: 2.3% by moles, HEA: 1% by moles)

Polymer (F3): E-CTFE-HPA (40/55/5% by moles)

Di-isocyanate (D1): Poly(ethylene adipate)-tolylene 2,4-diisocyanate (n is such that the number average molecular weight is 2700) of formula:

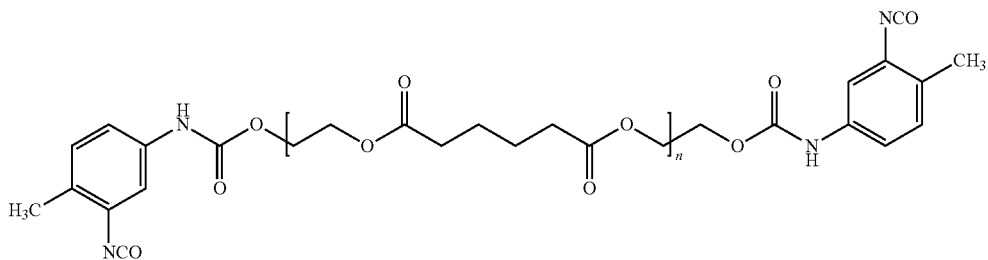

Di-isocyanate (D2): Poly(propylene glycol)-tolylene 2,4-diisocyanate (m is such that the number average molecular weight is 2300) of formula:

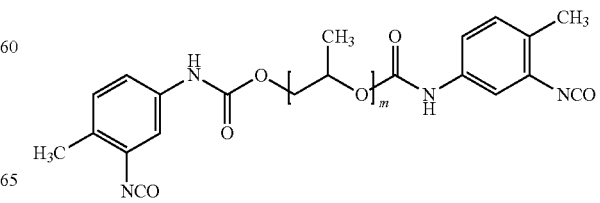

PEO-1: Polyethylene glycol of formula HO—(CH$_2$CH$_2$O)$_n$—H, wherein n is about 2200-3900, having an average molecular weight comprised between 100000 and 170000.

PEO-2: Polyethylene glycol of formula HO—(CH$_2$CH$_2$O)$_n$—CH$_3$, wherein n is about 45, having an average molecular weight comprised of about 2000.

Measurement of Contact Angle

The contact angle towards water or hexadecane was evaluated at 25° C. by using Dataphysics OCA 20 apparatus, according to ASTM D 5725-99. Measures were taken on moulded plaques of polymers.

The contact angle value towards water is a measure of the hydrophilic properties of the polymer. As the contact angle value towards water decreases, the hydrophilic properties of the polymer are increased.

The contact angle value towards hexadecane is a measure of the oleophobic properties of the polymer. As the contact angle value towards hexadecane increases, the oleophobic properties of the polymer are increased.

Measurement of Melt Viscosity

The melt viscosity was measured using a dynamic mechanical spectrometer, Rheometric RMS 800, in a parallel plate configuration (25 mm) with a dynamic frequency sweep test, according to ASTM D 4440 at 230° C. Measures were taken on moulded plaques of polymers.

The melt viscosity is a measure of the molecular weight of the polymer. As the melt viscosity value increases, the molecular weight of the polymer increases.

Measurement of Insolubles 0.15 g of polymer were dissolved in 50 g of N,N-dimethyl formamide (DMF) under magnetic stirring at 50° C. for 6 hours to yield a composition which was centrifuged at 20000 rpm/h. Then two phases, if any, were separated and the solid part was washed with DMF and dried at 130° C. for two days.

The insolubles test is a measure of the molecular weight of the polymer. As the solubility of the polymer in DMF decreases, the molecular weight of the polymer increases.

Measurement of Char Yield (Y$_c$)

The char yield (Y$_c$) was measured at 550° C. by thermogravimetric analysis (TGA) under nitrogen using a Perkin Elmer TGA7 thermal gravimetric analysiser at a heating rate of 10° C. min$^{-1}$.

The char yield (Y$_c$) is a measure of the flame retardancy of the polymer. As the char yield value increases, the flammability of the polymer is depressed.

Measurement of Flow

A glass tube was blocked on one side by a piece of a membrane and filled with demineralized water (about 90 ml). Then, on the free end side of the tube a pressure of 1 bar was imposed with nitrogen and the flux was then measured in a given time. The test was run at 25° C. The values as given below are the average of about 10 measurements.

The water flow value is a measure of the hydrophilic properties of the polymer. As the water flow value increases, the hydrophilic properties of the polymer are increased.

Measurement of Porosity

Specimens of membranes having a surface of 11.3 cm$^2$ were dried and weighed (W1). The membranes were immersed in isopropanol for 16 hours. The wet specimens were then removed from isopropanol, letting their surface be dried, and weighed (W2). The difference between W2 and W1 values represents the weight of the alcohol that has diffused into the inner pore of the membrane. The void spaces in the membrane structure or membrane porosity was calculated using the density of isopropanol and the density of the polymers.

Preparation of Polymer (F1)

In a 80 liters reactor equipped with an impeller running at a speed of 300 rpm were introduced in sequence 52335 g of demineralised water and 17.9 g of METHOCEL® K100 GR suspending agent.

The reactor was then vented and pressurized with nitrogen to 1 bar. Hydroxyethylacrylate (HEA) (21.5 g) was introduced in the reactor, followed by 136 g of a 75% by weight solution of t-amyl perpivalate in isododecane and 22646 g of VDF. The reactor was then gradually heated to 52° C., corresponding to a final pressure of 120 bar, which was maintained constant by feeding 15 liters of a 20 g/l aqueous solution of HEA.

After 590 minutes, the polymerization run was stopped by degassing the suspension until reaching atmospheric pressure. The polymer was collected by filtration, suspended in demineralised water and filtered again. After oven-drying at 50° C., 18.3 Kg of a VDF-HEA copolymer, having a HEA content of 1% by moles, as measured by NMR, were obtained.

Preparation of Polymer (F2)

In a 4 liters reactor equipped with an impeller running at a speed of 880 rpm were introduced in sequence 2455 g of demineralised water and 0.63 g of METHOCEL® K100 GR suspending agent.

The reactor was vented and pressurized with nitrogen to 1 bar, then 8.55 g of a 75% by weight solution of t-amyl perpivalate initiator in isododecane were introduced into the reactor, followed by 107 g of HFP and 947 g of VDF. The reactor was then gradually heated to 52° C. to a final pressure of 110 bar. Temperature was maintained constant at 55° C. throughout the whole trial. Pressure was maintained constant at 110 bar throughout the whole trial by feeding a 19.96 g/l aqueous solution of HEA monomer to a total of 709 ml. After 510 minutes, the polymerization run was stopped by degassing the suspension until reaching atmospheric pressure. The polymer so obtained was then recovered, washed with demineralised water and oven-dried at 50° C. (814 g).

The polymer so obtained contained 2.3% by moles of HFP and 1.0% by moles of HEA, as measured by NMR.

Preparation of Polymer (F3)

In an enamelled autoclave equipped with baffles and stirrer working at 450 rpm, 3 liters of demineralised water, 63 g of chloroform, 95 ml of a solution of hydroxypropylacrilate (HPA) (50% by volume) and water (50% by volume) and 7 Kg of chlorotrifluoroethylene were introduced. Then the temperature was brought to 15° C. and ethylene was fed up to a pressure of 8.2 bar. The radical initiator was then continuously fed to the autoclave during the polymerization run under the form of a solution of trichloroacetylperoxide (TCAP) in isooctane (0.12 g TCAP/ml) maintained at −17° C. Furthermore, 95 ml of the solution of hydroxypropylacrylate and water were fed at consumption of 20, 40, 60, 80, 100, 120, 140, 160, and 180 g of ethylene.

The pressure was maintained constant during 298 min, by continuously feeding ethylene to the reactor up to a consumption of 200 g.

The product discharged from the autoclave was dried at 120° C. for about 16 hours. 1280 g of a polymer having a melting point of 177.2° C. and a molar composition E/CTFE/HPA of 40/55/5 were so obtained.

EXAMPLE 1

Blend of Polymer (F1) with Di-Isocyanate (D1) (1.95% by Weight of Polymer (F1))

The polymer (F1) and the di-isocyanate (D1) were blended in a rapid mixer at 300 rpm for 3 minutes to yield a powder mixture which was then processed by extrusion in a double screw 30-34 extruder (LEISTRITZ), equipped with 6 temperature zones and a 4 mm-2 holes die.

Temperatures set points were set as follows:

TABLE 1

| Feed zone | T1 | T2 | T3 | T4 | T5 |
|---|---|---|---|---|---|
| 180° C. | 180° C. | 180° C. | 185° C. | 185° C. | 190° C. |

Screws speed was set at 100 rpm, with a feed rate of 20%, so as to yield a throughput rate of about 6 Kg/h, and a melt temperature of about 230° C. Extruded strands were cooled in a water bath, dried, calibrated and cut in a pelletizer.

FT-IR spectroscopic analyses showed urethane peaks in the polyurethane fluoropolymer so obtained (1535 cm$^{-1}$).

The polyurethane fluoropolymer had a contact angle towards water of 67.9 degrees and a melt viscosity of 100000 Pa·s at 1 rad/s.

EXAMPLE 2

Blend of Polymer (F1) with Di-Isocyanate (D1) (6.5% by Weight of Polymer (F1))

The same procedure as detailed under Example 1 was followed, but blending the polymer (F1) with 6.5% by weight of polymer (F1) of the di-isocyanate (D1).

FT-IR spectroscopic analyses showed urethane peaks in the polyurethane fluoropolymer so obtained (1535 cm$^{-1}$).

The polyurethane fluoropolymer was endowed with a melt viscosity so high that extrusion was not possible.

EXAMPLE 3

Blend of Polymer (F1) with Di-Isocyanate (D1) (0.65% by Weight of Polymer (F1))

The same procedure as detailed under Example 1 was followed, but blending the polymer (F1) with 0.65% by weight of polymer (F1) of the di-isocyanate (D1).

FT-IR spectroscopic analyses showed urethane peaks in the polyurethane fluoropolymer so obtained (1535 cm$^{-1}$).

The polyurethane fluoropolymer had a contact angle towards water of 77.8 degrees.

EXAMPLE 4

Blend of Polymer (F1) with Di-Isocyanate (D2) (0.65% by Weight of Polymer (F1))

The same procedure as detailed under Example 1 was followed, but blending the polymer (F1) with 0.65% by weight of polymer (F1) of the di-isocyanate (D2).

FT-IR spectroscopic analyses showed urethane peaks in the polyurethane fluoropolymer so obtained (1535 cm$^{-1}$).

The polyurethane fluoropolymer had a contact angle towards water of 65.9 degrees.

COMPARATIVE EXAMPLE 1

The polymer (F1), free from urethane moieties, had a contact angle towards water of 90 degrees and a melt viscosity of 10000 Pa·s at 1 rad/s.

COMPARATIVE EXAMPLE 2

The SOLEF® 6008 VDF homopolymer, free from hydroxyl groups and from urethane moieties, had a contact angle towards water of 87.1 degrees and a melt viscosity of 2000 Pa·s at 1 rad/s.

COMPARATIVE EXAMPLE 3

Blend of SOLEF® 6008 VDF Homopolymer with di-isocyanate (D1) (6.5% by Weight of SOLEF® 6008 VDF Homopolymer)

The same procedure as detailed under Example 1 was followed, but blending the SOLEF® 6008 VDF homopolymer with 6.5% by weight of SOLEF® 6008 VDF homopolymer of the di-isocyanate (D1).

FT-IR spectroscopic analyses showed no urethane peaks in the polymer so obtained. The SOLEF® 6008 VDF homopolymer, free from hydroxyl groups, did not react with the di-isocyanate compound (D1) so that the resulting polymer was free from bridging groups comprising one or more urethane moieties.

The polymer so obtained had a contact angle towards water of 87.1 degrees and a melt viscosity of 1000 Pa·s at 1 rad/s.

EXAMPLE 5

Blend of Polymer (F3) with Di-Isocyanate (D1) (2.0% by Weight of Polymer (F3))

The polymer (F3) (57.7 g) and the di-isocyanate (D1) (1.3 g) were blended at room temperature. The molar ratio between the acrylate groups in polymer (F3) and the isocyanate groups in di-isocyanate (D1) was 28:1.

The mixture was then charged in a heating mixer and stirred (30 rpm) for 6 minutes at 210° C. The blend was finally discharged and cool down to room temperature.

FT-IR spectroscopic analyses showed urethane peaks in the polyurethane fluoropolymer so obtained (1535 cm$^{-1}$).

The polyurethane fluoropolymer had a contact angle towards water of 82.8 degrees and a melt viscosity of 60000 Pas at 1 rad/s.

COMPARATIVE EXAMPLE 4

The polymer (F3), free from urethane moieties, had a contact angle towards water of 93.2 degrees and a melt viscosity of 9000 Pa·s at 1 rad/s.

EXAMPLE 6

26.75 g (0.204 eq.) of 4,4'-methylenebis(cyclohexylisocyanate), 90 g of a 10% by weight polymer (F2) solution in acetone (0.134 eq. of polymer (F2)) and 1 g of 1,4-butylenediamine were dispersed and mixed with a magnetic stirrer at room temperature. After 20 minutes, a viscous and opalescent composition was obtained which was poured into a tray and put into an oven at 50° C. for 3 hours. Then the oven temperature was raised up to 100° C. for 4 hours, and subsequently at 150° C. for 30 minutes. The polymer slab was thoroughly washed with ethyl acetate until the solvent was clear. The slab was put again in the oven at 100° C. for 1 hour to remove residual solvent.

The polyurethane fluoropolymer so obtained contained 34% by weight of recurring units derived from polymer (F2) and 66% by weight of polyurethane recurring units.

FT-IR spectroscopic analysis showed urethane peaks in the polyurethane fluoropolymer in the range 1690-1710 cm$^{-1}$.

The polyurethane fluoropolymer so obtained had a contact angle towards hexadecane of 40 degrees and a char yield of about 30% at 550° C.

The amount of insolubles in DMF of the polyurethane fluoropolymer so obtained was about 75% by weight.

COMPARATIVE EXAMPLE 5

The polymer (F2), free from urethane moieties, was soluble in DMF.

EXAMPLE 7

The same procedure as detailed under Example 6 was followed, but dispersing and mixing with a magnetic stirrer at room temperature 40.26 g (0.307 eq.) g of 4,4'-methylenebis(cyclohexylisocyanate), 7.15 g of a 10% by weight polymer (F2) solution in acetone (0.011 eq. of polymer (F2)), 8.38 g (0.270 eq.) of 1,2-ethanediol and 1 g of 1,4-butylenediamine.

The polyurethane fluoropolymer so obtained contained 1.6% by weight of recurring units derived from polymer (F2) and 98.4% by weight of polyurethane recurring units.

FT-IR spectroscopic analysis showed urethane peaks in the polyurethane fluoropolymer in the range 1690-1710 cm$^{-1}$.

The polyurethane fluoropolymer so obtained had a contact angle towards hexadecane of 29 degrees.

COMPARATIVE EXAMPLE 6

The same procedure as detailed under Example 6 was followed, but dispersing and mixing with a magnetic stirrer at room temperature 40.13 g (0.306 eq.) g of 4,4'-methylenebis(cyclohexylisocyanate), 8.87 g (0.286 eq.) of 1,2-ethanediol and 1 g of 1,4-butylenediamine.

FT-IR spectroscopic analysis showed urethane peaks in the polyurethane polymer in the range 1690-1710 cm$^{-1}$.

The polyurethane polymer so obtained, free from fluorinated blocks, had a contact angle towards hexadecane of 0 degrees and a char yield of 0% at 550° C.

EXAMPLE 8

Blend of Polymer (F1) (92.97% by Weight) with Di-Isocyanate (D2) (7.00% by Weight) and 1,2-Ethanediol (0.03% by Weight)

The same procedure as detailed under Example 1 was followed, but blending the polymer (F1) (92.97% by weight) with di-isocyanate (D2) (7.00% by weight) and 1,2-ethanediol (0.03% by weight).

EXAMPLE 9

Blend of Polymer (F1) (95.16% by Weight) with Di-Isocyanate (D2) (1.00% by Weight) and PEO-1 (3.84% by Weight)

The same procedure as detailed under Example 1 was followed, but blending the polymer (F1) (95.16% by weight) with di-isocyanate (D2) (1.00% by weight) and PEO-1 (3.84% by weight).

EXAMPLE 10

Blend of Polymer (F1) (95.16% by Weight) with Di-Isocyanate (D2) (1.00% by Weight) and PEO-2 (3.84% by Weight)

The same procedure as detailed under Example 1 was followed, but blending the polymer (F1) (95.16% by weight) with di-isocyanate (D2) (1.00% by weight) and PEO-2 (3.84% by weight).

EXAMPLE 11

Manufacture of a Membrane

A blend of the pellets obtained in Example 8 (30% by weight) and SOLEF® 1015 PVDF homopolymer powder (70% by weight) were dissolved in NMP reaching a solution concentration of 14% by weight. This solution was then casted to form a film in an Elcometer 4340 film applicator which was later put in a water bath at room temperature. The porous membrane had a porosity of 86% and the water flow was 890 L/h×m$^2$.

COMPARATIVE EXAMPLE 7

Manufacture of a Membrane

The same procedure as detailed under Example 11 was followed, but using only SOLEF® 1015 PVDF homopolymer powder. The porous membrane had a porosity of 83% and the water flow was 112 L/h×m$^2$.

It has been thus shown that the membrane obtained by using the polyurethane fluoropolymer of the invention is advantageously more hydrophilic than standard membranes obtained by using pure fluoropolymers.

The invention claimed is:

1. A polyurethane fluoropolymer ($F_P$) obtained by reacting:
   (i) at least one fluoropolymer (F) selected from:
      a polymer ($F_1$), wherein polymer ($F_1$) is manufactured by aqueous suspension polymerization process or by an aqueous emulsion polymerization process and wherein polymer ($F_1$) comprises recurring units derived from vinylidene fluoride (VDF) and from 0.01% to 10% by moles, based on the total moles of recurring units in polymer ($F_1$), of recurring units derived from at least one (meth)acrylic monomer (MA) of formula (I):

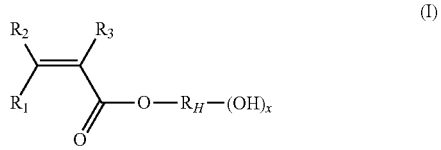

wherein:
   $R_1$, $R_2$, and $R_3$, equal to or different from each other, are independently selected from a hydrogen atom and a $C_1$-$C_3$ hydrocarbon group,
   $R_H$ is a $C_1$-$C_{10}$ hydrocarbon group optionally comprising one or more functional groups selected from double bonds, epoxy, ester, ether and carboxylic acid groups, and
   x is an integer between 1 and 5; or
   a polymer ($F_2$), wherein polymer ($F_2$) is manufactured by aqueous suspension polymerization or by an aqueous emulsion polymerization process and wherein polymer ($F_2$) comprises recurring units derived from ethylene (E), from at least one fluorinated monomer (F) selected from tetrafluoroethylene (TFE), chlorotrifluoroethylene (CTFE), and mixtures thereof, and from 0.01% to 10% by moles, based on the total moles of recurring units in polymer ($F_2$), of recurring units derived from at least one (meth)acrylic monomer (MA) of formula (I), with (ii) at least one isocyanate compound (I) comprising at least one isocyanate functional group, (iii) in the presence of one or more chain extenders selected from polyethylene glycols, said polyurethane fluoropolymer ($F_P$) comprising at least one bridging group selected from bridging groups of formula (a):

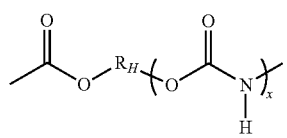

wherein:
$R_H$ is a $C_1$-$C_{10}$ hydrocarbon group optionally comprising one or more functional groups selected from double bonds, epoxy, ester, ether and carboxylic acid groups, and x is an integer between 1 and 5.

2. The polyurethane fluoropolymer ($F_P$) according to claim 1, comprising:
from 0.01% to 99.99% by weight, based on the weight of said polyurethane fluoropolymer ($F_P$), of at least one fluorinated block comprising a fluorocarbon chain, and
from 99.99% to 0.01% by weight, based on the weight of said polyurethane fluoropolymer ($F_P$), of at least one hydrogenated block comprising a hydrocarbon chain, said blocks being linked to each other by one or more urethane moieties.

3. The polyurethane fluoropolymer ($F_P$) according to claim 1, obtained by reacting:
(i) at least 50% by weight, based on the total weight of fluoropolymer (F) and isocyanate compound (I), of at least one fluoropolymer (F),
with
(ii) less than 50% by weight, based on the total weight of fluoropolymer (F) and isocyanate compound (I), of at least one isocyanate compound (I),
(iii) in the presence of one or more chain extenders.

4. The polyurethane fluoropolymer ($F_P$) according to claim 3, comprising:
at least 80% by weight, based on the weight of said polyurethane fluoropolymer ($F_P$), of at least one fluorinated block comprising a fluorocarbon chain, and
at most 20% by weight, based on the weight of said polyurethane fluoropolymer ($F_P$), of at least one hydrogenated block comprising a hydrocarbon chain,
said blocks being linked to each other by one or more urethane moieties.

5. The polyurethane fluoropolymer ($F_P$) according to claim 1, obtained by reacting:
(i) at least 50% by weight, based on the total weight of fluoropolymer (F), isocyanate compound (I) and chain extender, of at least one fluoropolymer (F),
with
(ii) less than 50% by weight, based on the total weight of fluoropolymer (F), isocyanate compound (I) and chain extender, of at least one isocyanate compound (I), and
(iii) from 0.01% to 50% by weight, based on the total weight of fluoropolymer (F), isocyanate compound (I) and chain extender, of one or more chain extenders.

6. The polyurethane fluoropolymer ($F_P$) according to claim 1, wherein the isocyanate compound (I) comprises at least one polyisocyanate compound ($I_P$) comprising at least two isocyanate functional groups, and wherein the polyurethane fluoropolymer ($F_P$) is obtained by reacting:
(i) less than 50% by weight, based on the total weight of fluoropolymer (F) and polyisocyanate compound ($I_P$), of at least one fluoropolymer (F),
with
(ii) at least 50% by weight, based on the total weight of fluoropolymer (F) and polyisocyanate compound ($I_P$), of at least one polyisocyanate compound ($I_P$),
(iii) in the presence of one or more chain extenders.

7. The polyurethane fluoropolymer ($F_P$) according to claim 6, comprising:
at most 50% by weight, based on the weight of said polyurethane fluoropolymer ($F_P$), of at least one fluorinated block comprising a fluorocarbon chain, and
at least 50% by weight, based on the weight of said polyurethane fluoropolymer ($F_P$), of at least one hydrogenated block comprising a hydrocarbon chain,
said blocks being linked to each other by one or more urethane moieties.

8. A process for the manufacture of the polyurethane fluoropolymer ($F_P$) according to claim 1, said process comprising blending at least one fluoropolymer (F), at least one isocyanate compound (I) and the one or more chain extenders, optionally in the presence of a liquid medium, under temperatures comprised between 20° C. and 300° C.

9. A membrane comprising at least one polyurethane fluoropolymer ($F_P$) according to claim 1.

10. A membrane comprising at least one polyurethane fluoropolymer ($F_P$) according to claim 3.

11. A polyurethane foam material comprising at least one polyurethane fluoropolymer ($F_P$) according to claim 1.

12. A polyurethane foam material comprising at least one polyurethane fluoropolymer ($F_P$) according to claim 6.

13. A membrane comprising at least one polyurethane fluoropolymer ($F_P$) according to claim 4.

14. A membrane comprising at least one polyurethane fluoropolymer ($F_P$) according to claim 5.

15. A polyurethane foam material comprising at least one polyurethane fluoropolymer ($F_P$) according to claim 7.

16. The polyurethane fluoropolymer ($F_P$) according to claim 2, comprising:
from 0.05% to 99.95% by weight, based on the weight of said polyurethane fluoropolymer ($F_P$), of at least one fluorinated block comprising a fluorocarbon chain, and
from 99.95% to 0.05% by weight, based on the weight of said polyurethane fluoropolymer ($F_P$), of at least one hydrogenated block comprising a hydrocarbon chain,
said blocks being linked to each other by one or more urethane moieties.

17. The polyurethane fluoropolymer ($F_P$) according to claim 4, comprising:
at least 95% by weight, based on the weight of said polyurethane fluoropolymer ($F_P$), of at least one fluorinated block comprising a fluorocarbon chain, and
at most 5% by weight, based on the weight of said polyurethane fluoropolymer ($F_P$), of at least one hydrogenated block comprising a hydrocarbon chain,
said blocks being linked to each other by one or more urethane moieties.

18. The polyurethane fluoropolymer ($F_P$) according to claim 7, comprising:

at most 40% by weight, based on the weight of said polyurethane fluoropolymer ($F_P$), of at least one fluorinated block comprising a fluorocarbon chain, and at least 60% by weight, based on the weight of said polyurethane fluoropolymer ($F_P$), of at least one hydrogenated block comprising a hydrocarbon chain, said blocks being linked to each other by one or more urethane moieties.

19. The polyurethane fluoropolymer ($F_P$) according to claim 1, wherein polymer ($F_1$) comprises from 0.1% to 1.5% by moles, based on the total moles of recurring units in polymer ($F_1$), of the recurring units derived from at least one (meth)acrylic monomer (MA) of formula (I).

20. The polyurethane fluoropolymer ($F_P$) according to claim 1, wherein polymer ($F_2$) comprises 0.05% to 8% by moles, based on the total moles of recurring units in polymer ($F_2$), of the recurring units derived from at least one (meth)acrylic monomer (MA) of formula (I).

21. The polyurethane fluoropolymer ($F_P$) according to claim 1, wherein the one or more chain extenders are selected from polyethylene glycols of formula HO—(CH$_2$CHRO)$_n$—R', wherein R is H or a $C_1$-$C_5$ alkyl group, R' is H, and n is an integer comprised between 4 and 230000.

* * * * *